(12) United States Patent
Balandier et al.

(10) Patent No.: US 8,915,085 B2
(45) Date of Patent: Dec. 23, 2014

(54) BLEED ASSEMBLY FOR A GAS TURBINE ENGINE

(75) Inventors: Quentin L. Balandier, Leicester (GB); John P. Vardy, Burton-on-Trent (GB)

(73) Assignee: Rolls-Royce PLC, London (GB)

( * ) Notice: Subject to any disclaimer, the term of this patent is extended or adjusted under 35 U.S.C. 154(b) by 998 days.

(21) Appl. No.: 12/968,707

(22) Filed: Dec. 15, 2010

(65) Prior Publication Data

US 2011/0146297 A1 Jun. 23, 2011

(30) Foreign Application Priority Data

Dec. 23, 2009 (GB) .................................. 0922425.4

(51) Int. Cl.
| | | |
|---|---|---|
| F02C 9/18 | (2006.01) | |
| F02K 3/075 | (2006.01) | |
| F01D 17/10 | (2006.01) | |
| F02C 6/08 | (2006.01) | |
| F04D 27/02 | (2006.01) | |

(52) U.S. Cl.
CPC .............. *F02K 3/075* (2013.01); *F01D 17/105* (2013.01); *F02C 6/08* (2013.01); *F02C 9/18* (2013.01); *F04D 27/0215* (2013.01); *F05D 2250/191* (2013.01)
USPC ................................ 60/751; 60/785; 60/725

(58) Field of Classification Search
CPC ....... F02C 6/18; F01D 17/105; F02D 27/023; F02D 27/0238; F04D 27/0215; F04D 27/0223
USPC ................ 60/751, 782, 785, 795, 806, 226.1; 415/44; 239/399
See application file for complete search history.

(56) References Cited

U.S. PATENT DOCUMENTS

| 5,169,288 | A | * | 12/1992 | Gliebe et al. ................... 415/119 |
| 2003/0068223 | A1 | * | 4/2003 | Nikkanen et al. ............. 415/144 |
| 2007/0261410 | A1 | * | 11/2007 | Frank et al. ..................... 60/785 |
| 2008/0053105 | A1 | * | 3/2008 | Appleby et al. ................ 60/785 |
| 2010/0115964 | A1 | * | 5/2010 | Kirby .............................. 60/785 |
| 2011/0146297 | A1 | * | 6/2011 | Balandier et al. .............. 60/785 |

FOREIGN PATENT DOCUMENTS

| EP | 1 775 477 A2 | 4/2007 | |
| EP | 1 900 924 A2 | 3/2008 | |
| WO | WO 03/046358 A1 | 6/2003 | |
| WO | WO 03046358 A1 * | 6/2003 | ............... F02K 1/34 |

OTHER PUBLICATIONS

Search Report issued in British Patent Application No. 0922425.4 dated Apr. 22, 2010.
Oct. 16, 2012 Search Report issued in European Patent Application No. 10 19 5043.

* cited by examiner

*Primary Examiner* — Phutthiwat Wongwian
*Assistant Examiner* — Marc J Amar
(74) *Attorney, Agent, or Firm* — Oliff PLC

(57) ABSTRACT

A bleed assembly for a gas turbine engine is provided. The assembly includes: a duct having an inlet and an outlet; a bleed valve that controls the flow of bleed fluid into the inlet; and a dome-shaped diffuser screen which covers the outlet. The diffuser screen has a plurality of through-holes for passage of the bleed fluid. Each through-hole has one or more nearest-neighbour through-holes at a nearest-neighbour spacing. At the periphery of the diffuser screen, the average nearest-neighbour spacing of the through-holes at a given radial distance from the centre of the diffuser screen increases with increasing radial distance.

3 Claims, 4 Drawing Sheets

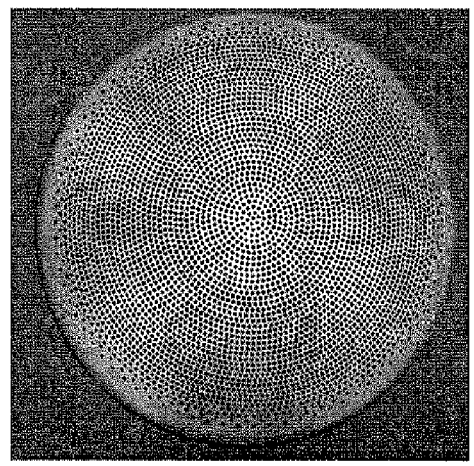 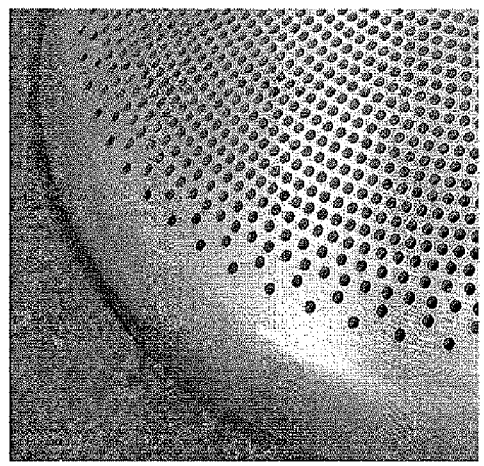
FIG. 7(a)  FIG. 7(b)
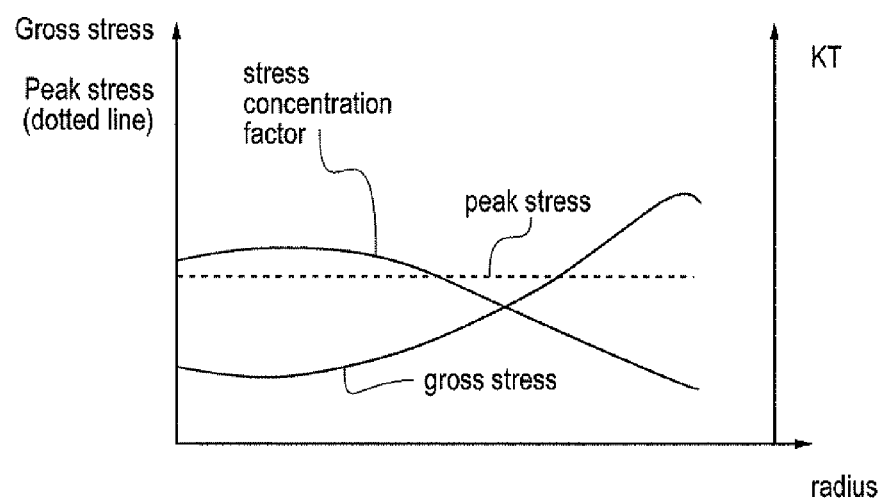
FIG. 8

BLEED ASSEMBLY FOR A GAS TURBINE ENGINE

FIELD OF THE INVENTION

The present invention relates to a bleed assembly for a gas turbine engine.

BACKGROUND OF THE INVENTION

The use and configuration of bleed assemblies are well known in gas turbine engines and are usually used to improve engine operability, particularly for the engine's compressors. In use, heated air at high pressure passes from a compressor, through a bleed valve and via a diffuser screen into a main gas stream. The compressor may be, for example, an intermediate or high pressure compressor and the bled gas stream may have a temperature of up to 400° C. The diffuser screen is usually a domed plate comprising a pattern of through-holes to enhance mixing with the main gas stream, which is typically a cooler bypass flow.

The total number, size and spacing of the through-holes of the diffuser screen are governed by performance and acoustic considerations. For example, diffuser screens can be configured to (a) attenuate noise produced within the bleed valve, (b) produce small separate jets of bleed air (rather than one large one) to increase the jets' noise frequency, which is then better attenuated by acoustic liners within the bypass duct and atmosphere, and (c) improve mixing of the hot gas flowing out of the bleed assembly with the cooler bypass flow in order to limit/prevent thermal damage to the engine nacelle and other components.

FIG. 1 shows a schematic longitudinal cross-section through a ducted fan gas turbine engine generally indicated at 10 and having a principal and rotational axis 11. The engine comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 12 is accelerated by the fan 13 to produce two airflows: a first airflow A into the intermediate pressure compressor 14 and a second airflow B which passes through the bypass duct 22 to provide propulsive thrust.

During engine operations, and particularly when changing rotational speed at low power, it is important to ensure that the pressure ratio across each compressor 14, 15 remains below a critical working point, otherwise the engine 10 can surge and flow through the engine breaks down. This can cause damage to the engine's components as well as aircraft handling problems.

To maintain a preferred pressure difference across both or just one of the compressors 14, 15, bleed assemblies 30 are provided to release pressure from an upstream part of a compressor.

FIG. 2 is a schematic cross-section showing in more detail bleed assemblies 30 associated with the intermediate pressure compressor 14 and high pressure compressor 15. Each bleed assembly comprises an inlet 31 and a bleed valve 32, a duct 34 and a diffuser screen 36. Airflows C and D, which are parts of core engine airflow A, may be diverted through the respective bleed assemblies, such that each airflow C, D enters the inlet, passes through the bleed valve and is channelled by the duct to the diffuser screen. Airflows C and D are then exhausted into the bypass duct 22 where they mix with bypass airflow B as hereinbefore described. There is usually an annular array of bleed valves around the core engine's casing 27.

However, a problem can arise that diffuser screens may rupture.

SUMMARY OF THE INVENTION

A first aspect of the invention provides a bleed assembly for a gas turbine engine, the assembly comprising:
- a duct having an inlet and an outlet,
- a bleed valve that controls the flow of bleed fluid into the inlet, and
- a dome-shaped diffuser screen which covers the outlet, the diffuser screen having a plurality of through-holes for passage of the bleed fluid, each through-hole having one or more nearest-neighbour through-holes at a nearest-neighbour spacing;
- wherein, at the periphery of the diffuser screen, the average nearest-neighbour spacing of the through-holes at a given radial distance from the centre of the diffuser screen increases with increasing radial distance.

An insight of the present inventors was that diffuser screen rupture can be caused by a combination of high stress concentration factors at the periphery of the screen and high stresses in these same regions. However, by increasing the average nearest-neighbour spacing of the through-holes towards the periphery of the diffuser screen, it is possible to reduce stress concentration factors at the periphery of the screen, reducing peak stress levels, and thereby reducing the likelihood of screen rupture.

The bleed assembly may have any one or, to the extent that they are compatible, any combination of the following optional features.

Typically the duct outlet is circular and the diffuser screen has a correspondingly circular periphery where it joins to the duct at the outlet. However, other outlet/screen periphery shapes are possible, such as elliptical. Typically the through-holes are circular. Typically the through-holes are of a uniform diameter. The spacing between nearest-neighbour through-holes can be measured from centre-to-centre of the through-holes or from edge-to-edge of the through-holes.

The through-holes may be arranged in concentric rings (e.g. circular rings in the case of a circular outlet/screen periphery) around the centre of the diffuser screen. At the periphery of the diffuser screen, for rings of successively greater diameter, the average spacing between nearest-neighbour through-holes within each ring can then be increased. This arrangement facilitates control of the average nearest-neighbour spacing of the through-holes.

Typically, the bleed assembly bleeds fluid from the compressor of the engine.

A further aspect of the invention provides a diffuser screen for the bleed assembly of the first aspect (the diffuser screen optionally including any one or, to the extent that they are compatible, any combination of the optional features of the first aspect).

A further aspect of the invention provides a gas turbine engine having one or more bleed assemblies of the first aspect (the diffuser screen optionally including any one or, to the extent that they are compatible, any combination of the optional features of the first aspect).

BRIEF DESCRIPTION OF THE DRAWINGS

Embodiments of the invention will now be described by way of example with reference to the accompanying drawings in which:

FIG. 7 shows a screen produced to have the pattern of through-holes of FIG. 6 in (a) a general view photograph and (b) a close-up photograph of an edge portion of the screen; and FIG. 8 shows, for the radially outer portion of the screen of FIG. 6, schematic plots of: gross surface stress in the screen, stress concentration factor and peak stress against radial distance.

DETAILED DESCRIPTION

Figure 1:
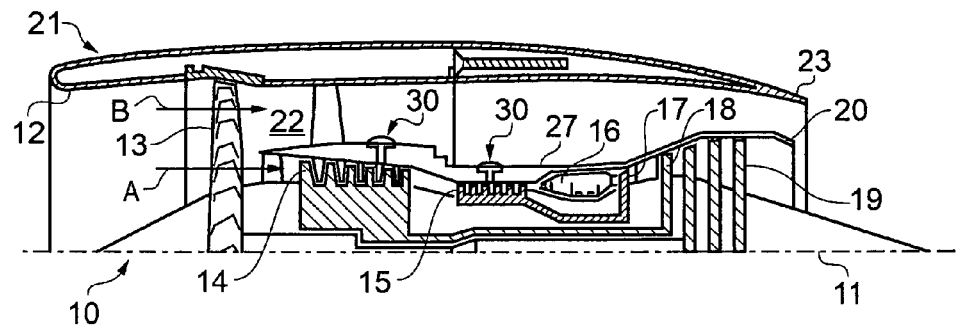
FIG. 1 shows a schematic longitudinal cross-section through a ducted fan gas turbine engine.
Figure 2:
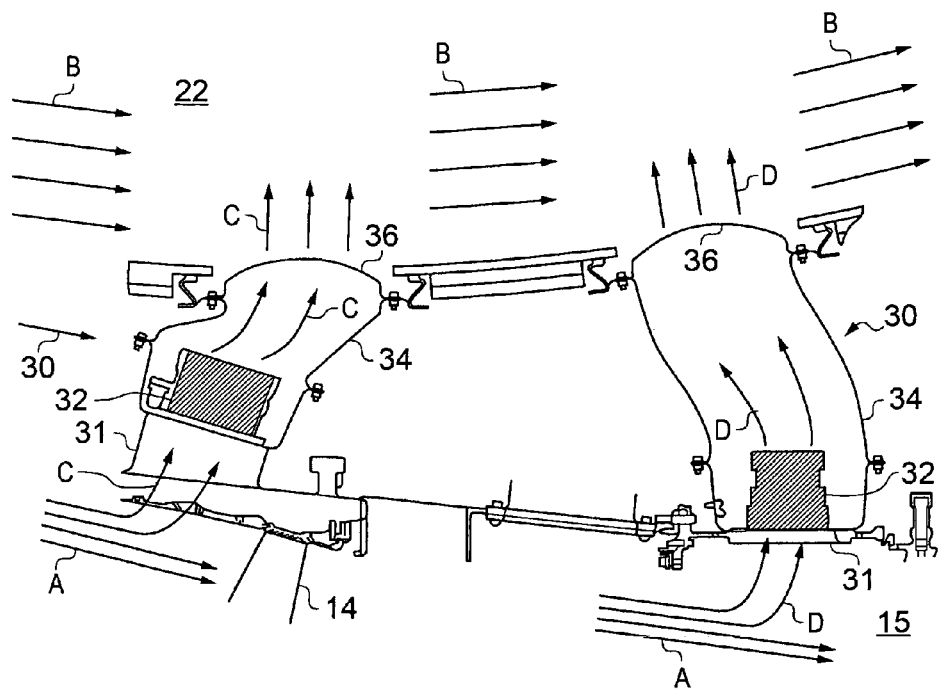
FIG. 2 is a schematic cross-section showing in more detail bleed assemblies associated with the intermediate pressure compressor and high pressure compressor of the engine of claim 1.
Figure 3:
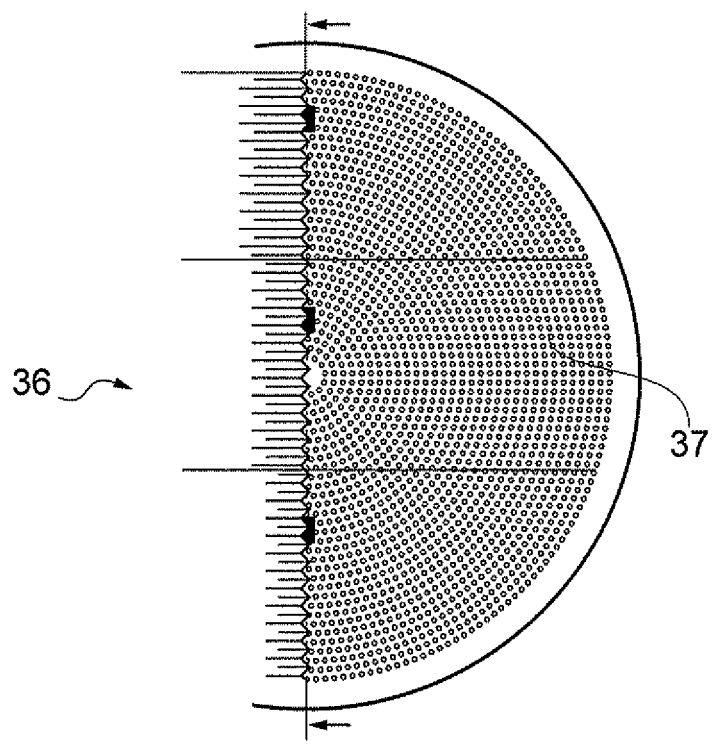
FIG. 3 shows a schematic view of half of a conventional dome-shaped diffuser screen.

FIG. 3 shows a schematic view of half of a conventional dome-shaped diffuser screen 36. A plurality of through-holes are formed in the screen for the passage of bleed fluid through the screen. The holes are arranged in a regular pattern 37, so that the spacing of each hole from its nearest-neighbour holes is the same at all positions across the pattern. It follows, therefore, that the average nearest-neighbour spacing of the through-holes at any given radial distance from the centre of the screen is uniform from the centre of the screen to the outer edge of the pattern.

Figure 4:
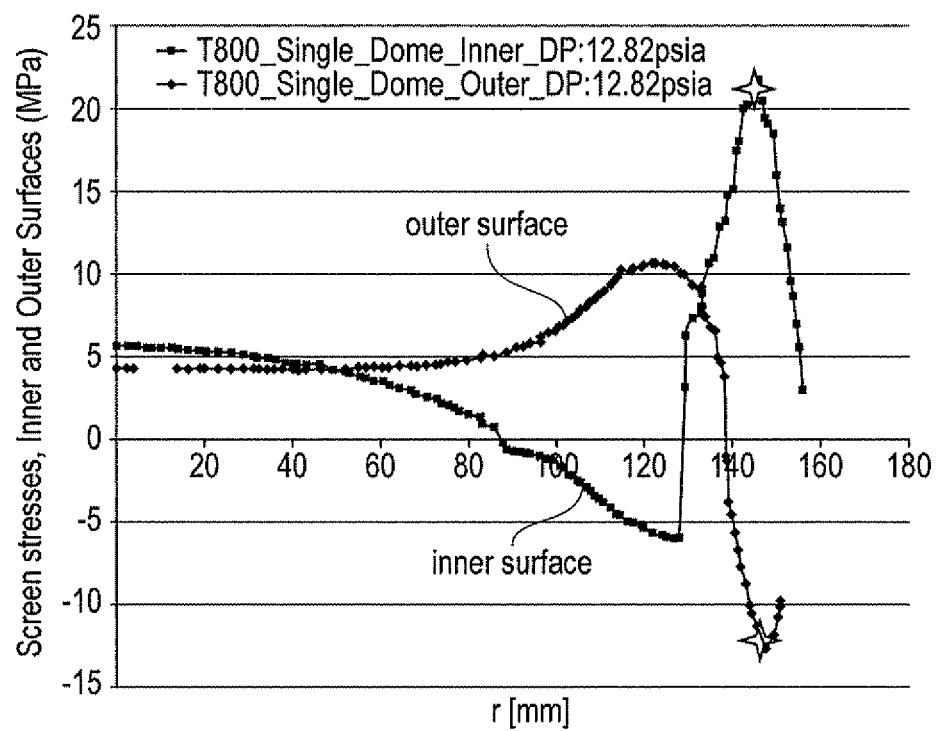
FIG. 4 shows plots of gross surface stress in the screen of FIG. 3 at respectively its inner and outer surfaces against radial distance.
Figure 5:
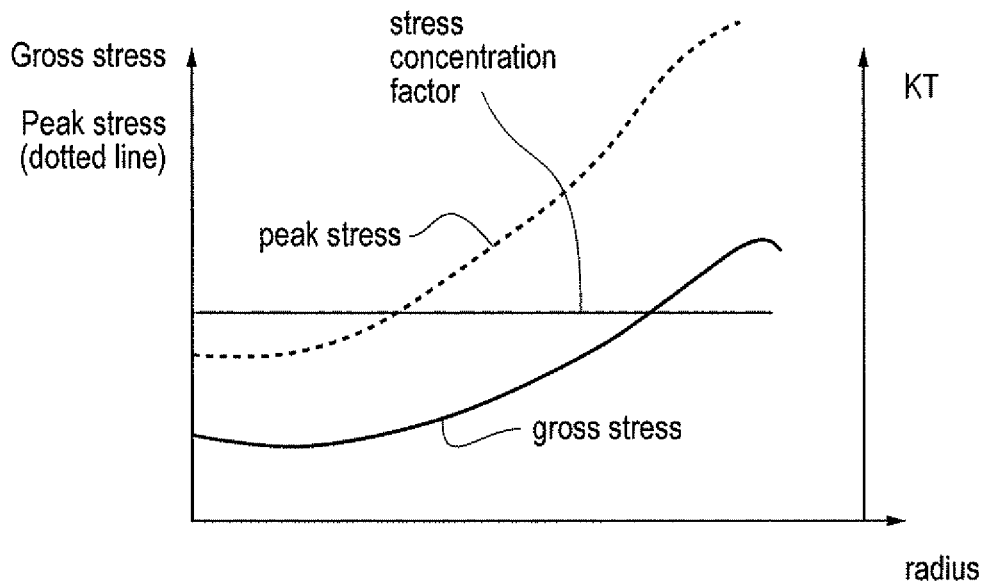
FIG. 5 shows, for the radially outer portion of the screen of FIG. 3, schematic plots of: gross surface stress in the screen, stress concentration factor and peak stress against radial distance.

Analysis shows that a stress state at the periphery of the screen 36 is generated by: a primary bending state due to deformation incompatibilities between the dome-shape screen and the generally cylindrical duct 34 whose outlet the screen covers, and a secondary bending state due to stiffness differences between the perforated and hence relatively flexible screen and the non-perforated and hence relatively stiff duct. FIG. 4 shows plots of gross surface stress (MPa) in the screen at respectively its inner and outer surfaces against radial distance (a radial distance of 0 mm being at the centre of the screen and a radial distance of about 155 mm being at the edge of the screen where it joins to the duct), the gross stress being the stress in the screen if there were no stress concentrations due to the through-holes. FIG. 5 shows schematic plots of gross surface stress in the screen against radial distance for the radially outer portion of the screen and the corresponding stress concentration factor in the screen due to the through-holes. The stress concentration factor is constant with radial distance because the though-holes are regularly spaced apart in the pattern 37. FIG. 5 also shows a schematic plot of peak stress, which is the stress obtained at the edge of a hole. Because of the stress concentration factor, the gross stress is amplified by the through-holes, to provide a very high peak stress at the outermost edge of the screen, which can lead to rupture of the screen.

Figure 6:
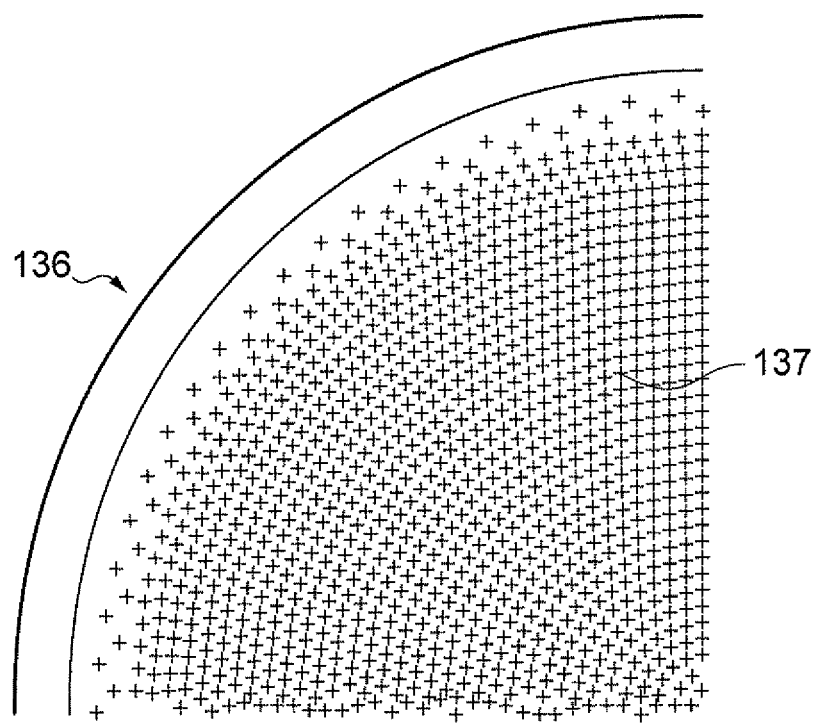
FIG. 6 shows a schematic view of quarter of a dome-shaped diffuser screen according to the present invention.

FIG. 6 shows a schematic view of quarter of a dome-shaped diffuser screen 136 according to the present invention. The screen has a pattern 137 of through-holes, the position of each through-hole being indicated by a "+". FIG. 7 shows a screen produced to have the pattern of through-holes of FIG. 6 in (a) a general view photograph and (b) a close-up photograph of an edge portion of the screen. The screen 136 has a circular periphery, and the pattern 137 is produced by arranging the through-holes in concentric circles centred on the centre of the screen. The diameter of each through-hole is 2.3 mm. In the majority of the circles the thickness of the ligament of metal between nearest-neighbour holes (i.e. the distance from the edge of one hole to the edge of its nearest neighbour) of a particular circle is 1.1 mm. However, for the fifth and sixth circles from the outer edge of the pattern, the thickness of the ligament of metal between nearest-neighbour holes of a particular circle is 1.3 mm; for the third and fourth circles from the outer edge of the pattern, the thickness of the ligament of metal between nearest-neighbour holes of a particular circle is 2.3 mm; and for the circle at the outer edge of the pattern and the circle immediately inside that, the thickness of the ligament of metal between nearest-neighbour holes of a particular circle is 7.1 mm.

Increasing the spacing in this way between nearest-neighbour through-holes within the is six rings at the outer edge of the pattern 137 has the effect, over the portion of the pattern occupied by these rings, of increasing the average nearest-neighbour spacing of the through-holes with increasing radial distance from the centre of the diffuser screen.

FIG. 8 shows schematic plots of gross surface stress in the screen 136 against radial distance for the portion of the pattern occupied by the outer six rings and the corresponding stress concentration factor in the screen due to the more spaced apart through-holes. Advantageously, the stress concentration factor now significantly reduces towards the edge of the pattern. Because of the reduction in stress concentration factor, the increase in gross stress towards the edge of the pattern is compensated for, which avoids producing a high increase in peak stress (also plotted in FIG. 8) at the outermost edge of the screen. In this way, the likelihood of rupture of the screen is reduced, leading to improvements in screen lifetime and reliability.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A bleed assembly for a gas turbine engine, the assembly comprising:
   a duct having an inlet and an outlet,
   a bleed valve that controls the flow of bleed fluid into the inlet, and
   a dome-shaped diffuser screen which covers the outlet, the diffuser screen having a plurality of through-holes for passage of the bleed fluid, each through-hole being adjacent one or more neighbouring through-holes,
   wherein the through-holes are arranged in concentric rings around the centre of the diffuser screen, with the spacing between neighbouring through-holes being uniform within each ring,
   wherein all of the through-holes have the same diameter, and
   wherein, in a region of the diffuser screen near a periphery of the diffuser screen, for rings of successively greater diameter, the spacing between neighbouring through-holes within each ring is increased.

2. A bleed assembly according to claim 1 which bleeds fluid from a compressor of the engine.

3. A gas turbine engine having one or more bleed assemblies according to claim 1.

* * * * *